United States Patent
Koreeda et al.

(10) Patent No.: US 7,043,107 B2
(45) Date of Patent: May 9, 2006

(54) FLEXIBLE OPTICAL CONNECTING PART

(75) Inventors: Yuichi Koreeda, Tokyo (JP); Hiroaki Koshizuka, Tokyo (JP); Hiroshi Kawazoe, Ibaraki (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 98 days.

(21) Appl. No.: 10/794,270

(22) Filed: Mar. 4, 2004

(65) Prior Publication Data

US 2004/0184706 A1    Sep. 23, 2004

(30) Foreign Application Priority Data

Mar. 6, 2003   (JP)   ............... 2003-060164

(51) Int. Cl.
*G02B 6/12*   (2006.01)
*G02B 6/36*   (2006.01)

(52) U.S. Cl. ............... 385/14; 385/88; 385/89
(58) Field of Classification Search ............... 385/14
See application file for complete search history.

(56) References Cited

U.S. PATENT DOCUMENTS

| 5,076,656 | A | * | 12/1991 | Briggs et al. ............ 385/71 |
| 5,204,925 | A | * | 4/1993 | Bonanni et al. ............ 385/89 |
| 6,537,480 | B1 | * | 3/2003 | Becker et al. ............ 364/400 |
| 6,743,196 | B1 | * | 6/2004 | Barbut et al. ............ 604/101.01 |
| 6,785,562 | B1 | * | 8/2004 | Lee et al. ............ 455/566 |
| 2003/0179980 | A1 | * | 9/2003 | Baechtle ............ 385/14 |

FOREIGN PATENT DOCUMENTS

JP          2574611 B2      10/1996

* cited by examiner

*Primary Examiner*—Frank G. Font
*Assistant Examiner*—Charlie Peng
(74) *Attorney, Agent, or Firm*—Frishauf, Holtz, Goodman & Chick, P.C.

(57) ABSTRACT

A flexible optical connecting part having enhanced flexibility and what is more, increased degree of freedom of routing. The flexible optical connecting part includes a flexible optical board having a body and tabs provided in a manner continuous with the body. Optical connectors are provided on the tabs. Tab-forming parts forming part of the tabs are formed with cuts.

5 Claims, 6 Drawing Sheets

FLEXIBLE OPTICAL CONNECTING PART

BACKGROUND OF THE INVENTION

1. Field of the Invention

This invention relates to a flexible optical connecting part for optically connecting between circuit boards including optical elements and between optical component parts.

2. Description of the Related Art

An optical transmission technology is used in communication networks, since it is suitable for high-speed high-capacity transmission of information. Recently, it has been proposed to utilize the optical transmission technology in an optical communication system and the like. Major component parts of such a system include an optical connecting part comprised of optical fibers forming signal paths for connection between parts or between boards, flexible boards sandwiching the optical fibers, and optical connectors attached to foremost ends of the optical fibers, respectively. As an example of the above optical connecting part, there has conventionally been proposed an optical connecting part (optical mutual connection device) comprised of a lower flexible board (board having flexibility), optical fibers fixed to the lower flexible board using an adhesive (pressure sensitive adhesive), an upper flexible board (cover layer) covering the surface of the resulting sub-assembly, and optical connectors (optical fiber-terminating means, such as pairs of silicon chips having a V groove formed therein) attached to foremost ends of the optical fibers (see Publication of Japanese Patent No. 2574611).

In general, optical fibers are manually connected to each other via optical connectors. Due to the recent demand for miniaturization of optical and electronic devices, only a minimum space is left in such devices, which makes it difficult to perform the operation of connecting optical fibers, and therefore, there is a demand for softening portions of the optical connecting part close to the optical connectors so as to facilitate the connecting operation. It is possible to comply with such a demand by reducing the thicknesses of flexible boards and adhesive layers. However, if the thicknesses of the flexible boards and the adhesive layers are reduced, there is a fear that the optical fibers cannot be sufficiently protected, which makes it impossible to employ this method.

SUMMARY OF THE INVENTION

It is an object of the invention to provide a flexible optical connecting part which has enhanced flexibility and what is more, increased degree of freedom of routing.

To attain the above object, the present invention provides a flexible optical connecting part having a body and at least one tab formed in a manner continuous with the body, the flexible optical connecting part comprising:

a lower flexible board having a lower body-forming part forming a lower part of the body and at least one lower tab-forming portion forming a lower part of the at least one tab and formed in a manner continuous with the lower body-forming part;

an upper flexible board having an upper body-forming part forming an upper part of the body and at least one upper tab-forming portion forming a lower part of the at least one tab and formed in a manner continuous with the upper body-forming part;

a first adhesive layer provided on the lower flexible board;

a second adhesive layer provided on an underside of the upper flexible board;

at least one optical fiber interposed between the first adhesive layer and the second adhesive layer such that the at least one optical fiber is fixed therebetween;

at least one optical connector provided on the at least one tab and connected to the at least one optical fiber; and a plurality of removed portion-defining portions formed in at least one of the upper tab-forming part and the lower tab-forming part, the removed portion-defining portions defining respective removed portions which are formed by removing portions of the at least one of the upper tab-forming part and the lower tab-forming part.

According to this flexible optical connecting part, since at least one of the lower and upper tab-forming portions is formed with the removed portions (defined by the removed portion-defining portions), the optical connecting part has an enhanced flexibility. Further, the removed portions are formed by removing portions of the tab-forming portions, there is no need to lay the optical fibers in a manner keeping away from the removed portions. This increases the degree of freedom of routing of the optical fibers. Moreover, since there is no need to lay the optical fibers in a manner keeping away from the removed portions, it is possible to lay the optical fibers on the lower flexible board with ease.

Preferably, the removed portions are cuts.

According to this preferred embodiment, the removed-portions are formed by cuts, and hence it is possible to easily set the depth, length, direction, and the like of the cuts. Therefore, the most suitable flexibility can be added to the tabs formed with the removed portion-defining portions.

More preferably, the cuts extend in a direction of width of the lower and upper tab-forming portions.

According to this preferred embodiment, the cuts extend in the direction of width of the lower and upper tab-forming portions, which makes it easy to bend the tabs in the direction of thickness thereof. This makes it possible to increase the flexibility of the flexible optical connecting part in the direction of thickness thereof.

More preferably, the cuts extend obliquely with respect to the direction of width of the lower and upper tab-forming portions.

According to this preferred embodiment, since the cuts extend obliquely with respect to the direction of width of the lower and upper tab-forming portions, the tabs are easy to be twisted, which makes it possible to enhance the flexibility of the flexible optical connecting part in the direction of torsion thereof.

Preferably, the removed portions are holes.

According to this preferred embodiment, the removed portions are formed by holes, so that the tabs are easy to be bent in the direction of the widths thereof and the direction of torsion thereof. This makes it possible to enhance the flexibility of the flexible optical connecting part in the direction of thickness thereof and the direction of torsion thereof.

The above and other objects, features and advantages of the present invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

Figure 1:
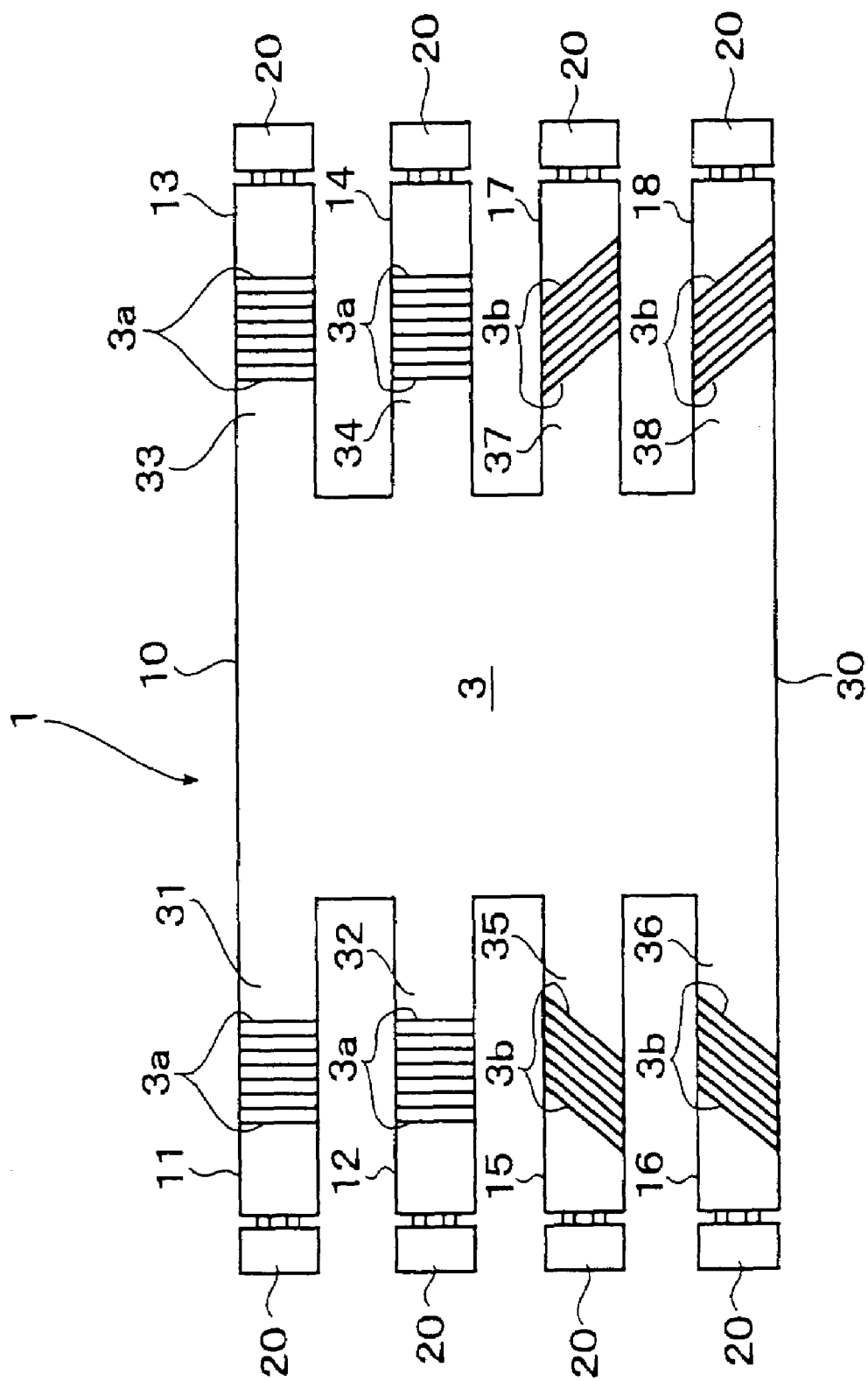
FIG. 1 is a bottom view of a flexible optical connecting part according to a first embodiment of the present invention.
Figure 2:
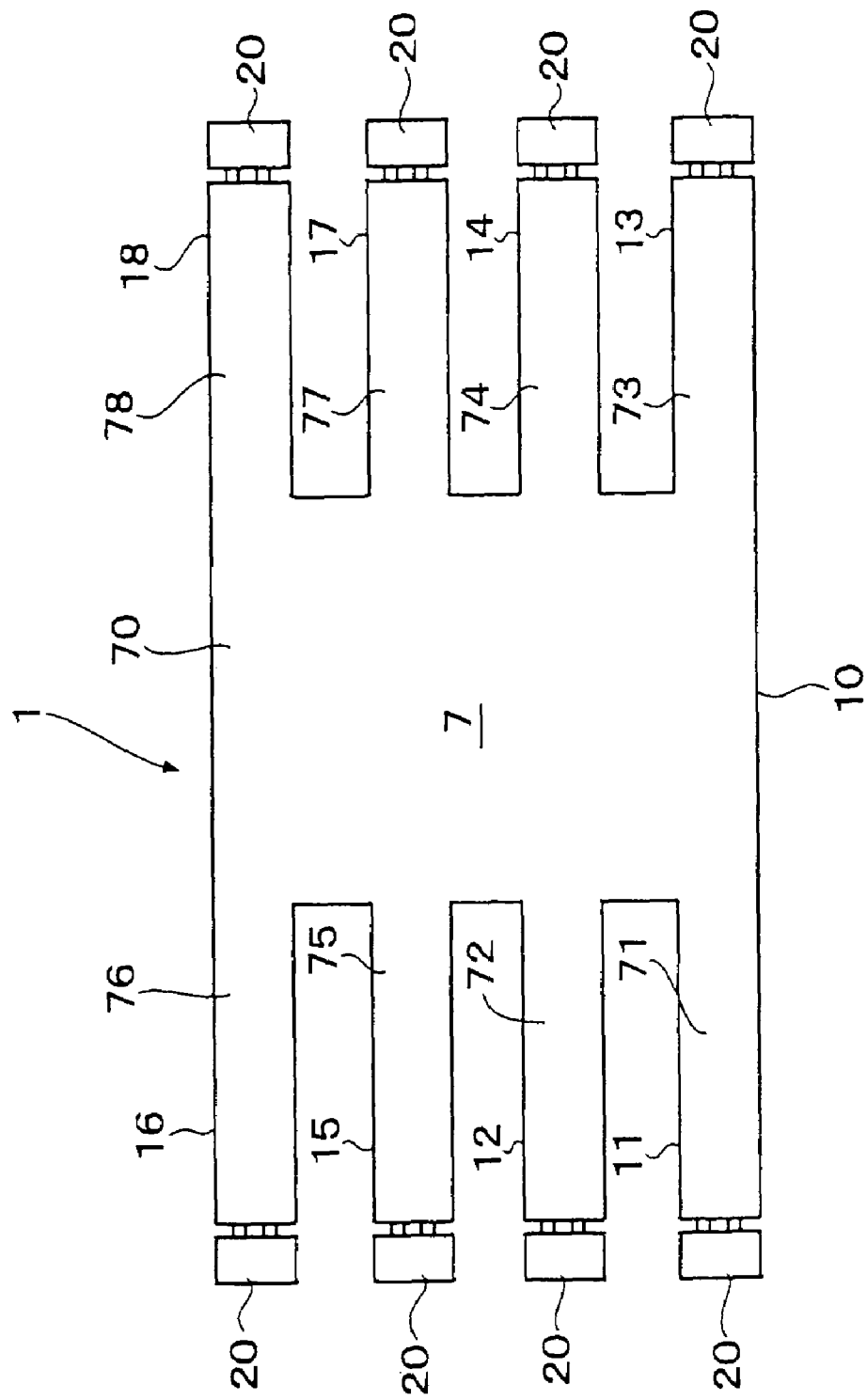
FIG. 2 is a plan view of the FIG. 1 flexible optical connecting part.
Figure 3:
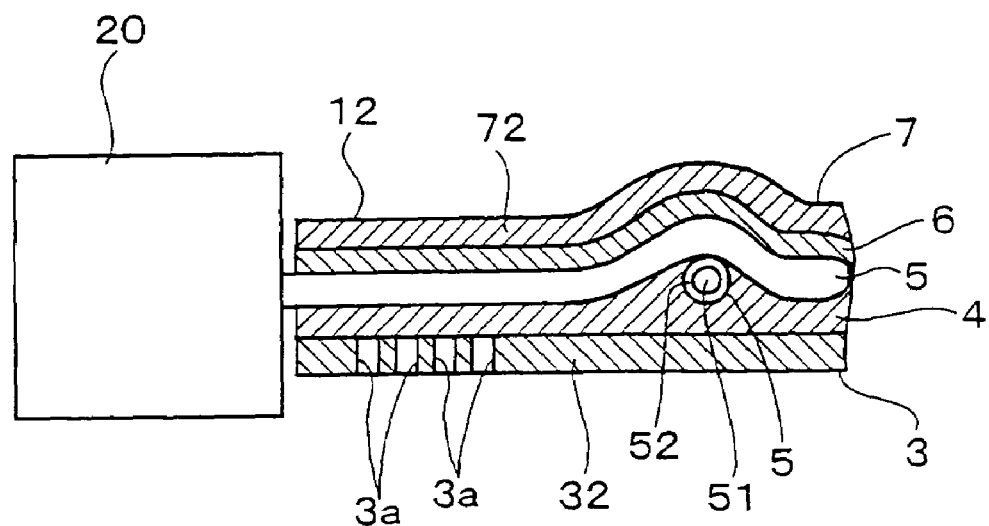
FIG. 3 is a cross-sectional view of a second tab (and part of a body) of the FIG. 1 flexible optical connecting part.
Figure 4:
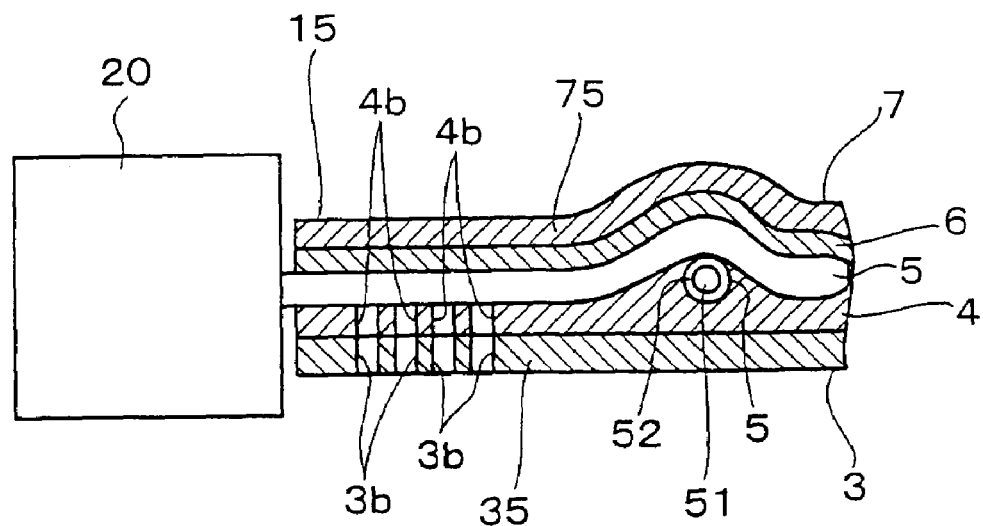
FIG. 4 is a cross-sectional view of a fifth tab (and part of the body) of the FIG. 1 flexible optical connecting part.
Figure 5:
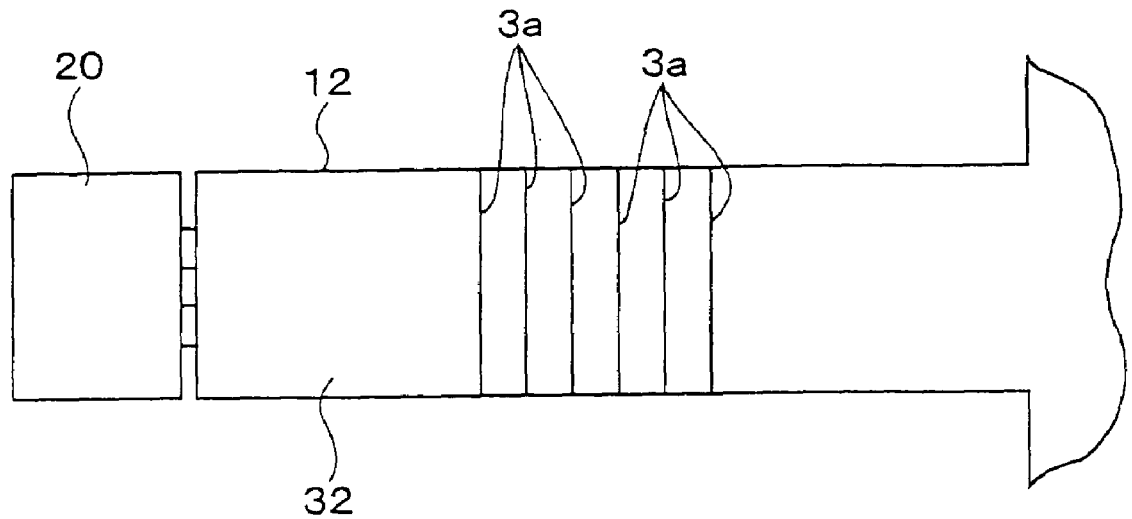
FIG. 5 is a plan view of the second tab.
Figure 6:
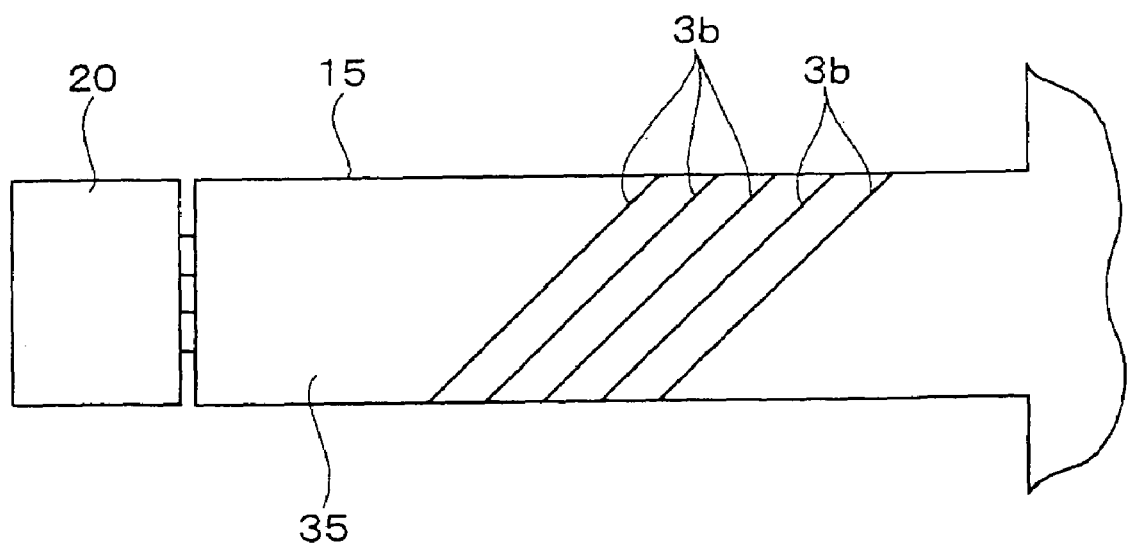
FIG. 6 is a plan view of the fifth tab.
Figure 7:
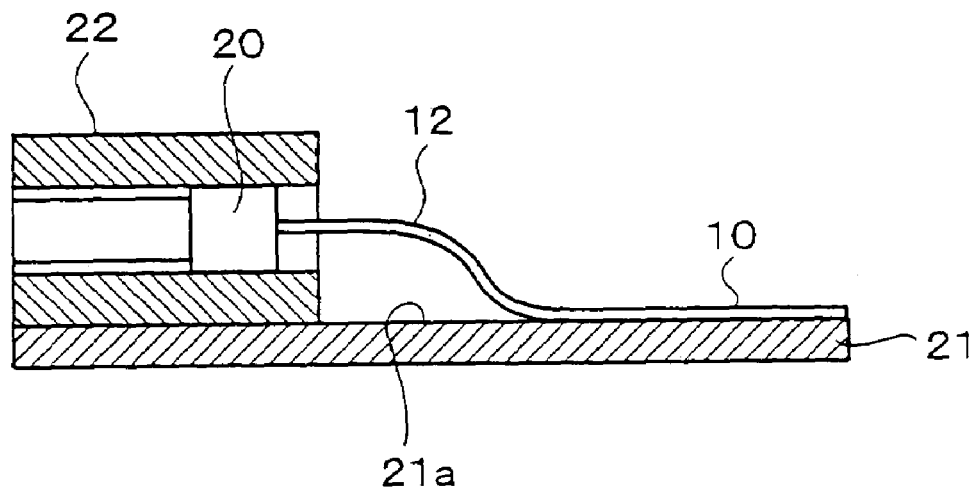
FIG. 7 is a cross-sectional view of the second tab in a connected state.
Figure 8:
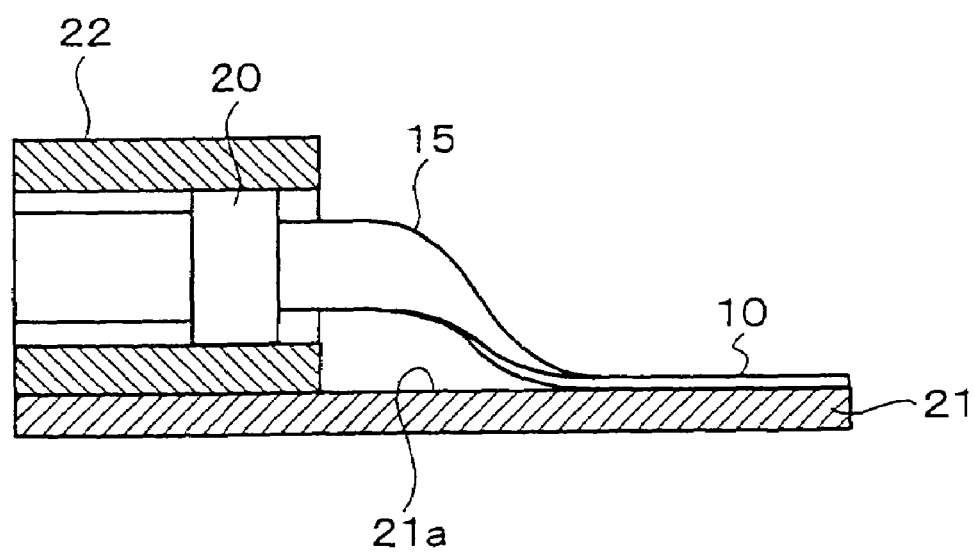
FIG. 8 is a cross-sectional view of the fifth tab in a connected state.

FIG. 1 is a bottom view of a flexible optical connecting part according to a first embodiment of the present invention. FIG. 2 is a plan view of the FIG. 1 flexible optical connecting part. FIG. 3 is a cross-sectional view of a second tab (and part of a body) of the FIG. 1 flexible optical connecting part. FIG. 4 is a cross-sectional view of a fifth tab (and part of the body) of the FIG. 1 flexible optical connecting part. FIG. 5 is a plan view of the second tab. FIG. 6 is a plan view of the fifth tab. FIG. 7 is a cross-sectional view of the second tab in a connected state. FIG. 8 is a cross-sectional view showing the fifth tab in a connected state.

The flexible optical connecting part is comprised of a flexible optical board 1, and a plurality of optical connectors 20.

The flexible optical board 1 includes a body 10, and first to eighth tabs 11 to 18. The body 1 has a rectangular shape. The first and second tabs 11 and 12 are tape-shaped, and provided at one end of the body 10 in a manner continuous therewith. The third and fourth tabs 13 and 14 are tape-shaped, and provided at the other end of the body 10 in a manner continuous therewith. The fifth and sixth tabs 15 and 16 are tape-shaped, and provided at the one end of the body 10 in a manner continuous therewith. The seventh and eighth tabs 17 and 18 are tape-shaped, and provided at the other end of the body 10 in a manner continuous therewith.

The optical connectors 20 are provided at ends of the first to eighth tabs 11 to 18, respectively. The shapes of the tabs 11 to 18 are determined depending on the number and layout of optical fibers 5, referred to hereinafter, a space within an apparatus in which the flexible optical connecting part is accommodated, and so forth. In general, they have a width of not larger than 5 mm but not smaller than 20 mm, and a length of not smaller than 50 mm.

Referring to FIG. 3, the flexible optical board 1 is comprised of a flexible base (lower flexible board) 3, optical fibers 5, and a flexible protective sheet (upper flexible board) 7.

As shown in FIG. 1, the flexible base 3 includes a body-forming part (lower body-forming part) 30, and first to eighth tab-forming portions (lower tab-forming portions) 31 to 38. For the flexible base 3, there is suitably employed any of a PET film, a PPS film, a polyimide film, and the like, which are used for forming printed circuit boards. The body-forming part 30 has a rectangular shape. The first and second tab-forming portions 31 and 32 are tape-shaped, and provided at one end of the body-forming part 30 in a manner continuous therewith. The third and fourth tab-forming portions 33 and 34 are tape-shaped, and provided at the other end of the body-forming part 30 in a manner continuous therewith. The fifth and sixth tab-forming portions 35 and 36 are tape-shaped, and provided at the one end of the body-forming part 30 in a manner continuous therewith. The seventh and eighth tab-forming portions 37 and 38 are tape-shaped, and provided at the other end of the body-forming part 30 in a manner continuous therewith.

The first to fourth tab-forming portions 31 to 34 are provided with portions (removed portion-defining portions) formed with cuts (removed portions) 3a so as to enhance flexibility of the first to fourth tabs 11 to 14 in the direction of thickness thereof. The cuts 3a extend in the direction of width of the tab-forming portions 31 to 34.

The fifth to eighth tab-forming portions 35 to 38 are provided with portions (removed portion-defining portions) formed with cuts (removed portions) 3b so as to enhance flexibility of the fifth to eighth tabs 15 to 18 in the direction of torsion thereof. The cuts 3b extend obliquely (at 45 degrees) with respect to the direction of width of the tab-forming portions 35 to 38.

The cuts 3a and 3b are formed by irradiating a laser beam onto the flexible base 3.

To further enhance the flexibility of the fifth to eighth tabs 15 to 18, a first adhesive layer 4, referred to hereinafter, may be formed with cuts 4b similar to the cuts 3b formed in each of the fifth to eighth tab-forming portions 35 to 38 (see FIG. 4).

As shown in FIGS. 3 and 4, each optical fiber 5 is comprised of an optical fiber core 51, and a covering 52 covering the optical fiber core 51. The optical fiber 5 is laid on the flexible base 3 via the first adhesive layer 4. Ends of the optical fibers 5 protruding from foremost ends of the tab-forming portions 31 to 38 are connected to the optical connectors 20, respectively.

As the optical fibers 5, there can be used optical fibers generally commercially available. For example, as glass optical fibers, there may be used single mode fibers, such as "SM-1005" available from Hitachi Cable, Ltd., and multi mode fibers, such as "50/125 CPC" available from Corning Corporation, and "GI-50/125", "QSI-85/125", and "SI-85/150" which are available from Hitachi Cable, Ltd.

The flexible protective sheet 7, as shown in FIG. 2, includes a body-forming part (upper body-forming part) 70, and first to eighth tab-forming portions (upper tab-forming portions) 71 to 78. For the flexible protective sheet 7, there may be suitably used any of a PET film, a polyimide film, and the like, which are used for forming printed circuit boards. The body-forming part 70 has a rectangular shape. The first and second tab-forming portions 71 and 72 are tape-shaped, and provided at one end of the body-forming part 70 in a manner continuous therewith. The third and fourth tab-forming portions 77 and 74 are tape-shaped, and provided at the other end of the body-forming part 70 in a manner continuous therewith. The fifth and sixth tab-forming portions 75 and 76 are tape-shaped, and provided at the one end of the body-forming part 70 in a manner continuous therewith. The seventh and eighth tab-forming portions 77 and 78 are tape-shaped, and provided at the other end of the body-forming part 70 in a manner continuous therewith. The flexible protective sheet 7 is stuck to the flexible base 3 via a second adhesive layer 6 such that the flexible protective sheet 7 covers the optical fibers 5.

As the material of the first and second adhesive layers 4 and 6, there may be used any of sheet-shaped adhesives, such as "No. 500" available from Nitto Denko Corporation, "No. 800 Series" of double faced adhesive sheets available from Nichiban Co., Ltd, "Adhesive Films of Y type, F type, H type, K type, OL type, and RS type" available from Panac Co., Ltd., "F-9473PC" available from Sumitomo 3M Corporation, etc., and any of liquid adhesives, such as "YR-3286" and "TSR-1521" available from GE Toshiba Silicones, and "DKQ-9-9000 Series" available from Dow Corning Corporation.

As the optical connectors 20, there are used multicore MT-type optical connectors, and further there may be used optical connectors generally commercially available, such as MU, SC, FC, ST, and MT-RJ, as well as V-groove substrates also generally commercially available. Referring to FIG. 7, the optical connectors 20 provided on the first to fourth tabs 11 to 14 are connected to mating optical connectors 22 in a state where the direction of width of each optical connector 20 and a mounting surface 21a of a printed circuit board 21 are parallel to each other. The first to fourth tabs 11 to 14 in this state are each bent into an S-shape. Referring to FIG. 8, the optical connectors 20 provided on the fifth to eighth tabs 15 to 18 are connected to mating optical connectors 22 in a state where the direction of width of each optical connector 20 and the mounting surface 21a of the printed circuit board 21 are at right angles to each other. Therefore, when the fifth to eighth tabs 15 to 18 are connected, they are each in a state twisted through 90 degrees.

When the optical connectors 20 provided on the first to fourth tabs 11 to 14 are connected to the mating optical connectors 22, the first to fourth tabs 11 to 14 are each bent in the direction of thickness thereof into the generally S-shape, as described above. In doing this, since the first to fourth tabs 11 to 14 are formed with the cuts 3a, they can be easily bent in the direction of the thickness thereof into the S-shape without undue stress.

When the optical connectors 20 provided on the fifth to eighth tabs 15 to 18 are connected to the mating optical connectors 22, the fifth to eighth tabs 15 to 18 are each twisted with respect to the central line in the direction of length thereof, as described above. In doing this, since the fifth to eighth tabs 15 to 18 are formed with the oblique cuts 3b, they can be easily twisted without undue stress.

The tabs 11 to 18 of the flexible optical connecting part according to the first embodiment is provided with the cuts 3a and 3b, and hence they have enhanced flexibility. Moreover, there is no need to lay the optical fibers 5 on the flexible base 3 in a manner keeping away from the cuts 3a and 3b.

The enhanced flexibility of the tabs 11 to 18 not only makes it easy to connect the optical fibers and difficult to break the same, but also contributes to enhanced reliability of the flexible optical connecting part, since undue reaction forces are not applied to the ends of the tabs 11 to 18, which solves the problem of breakage of these ends.

Figure 9:
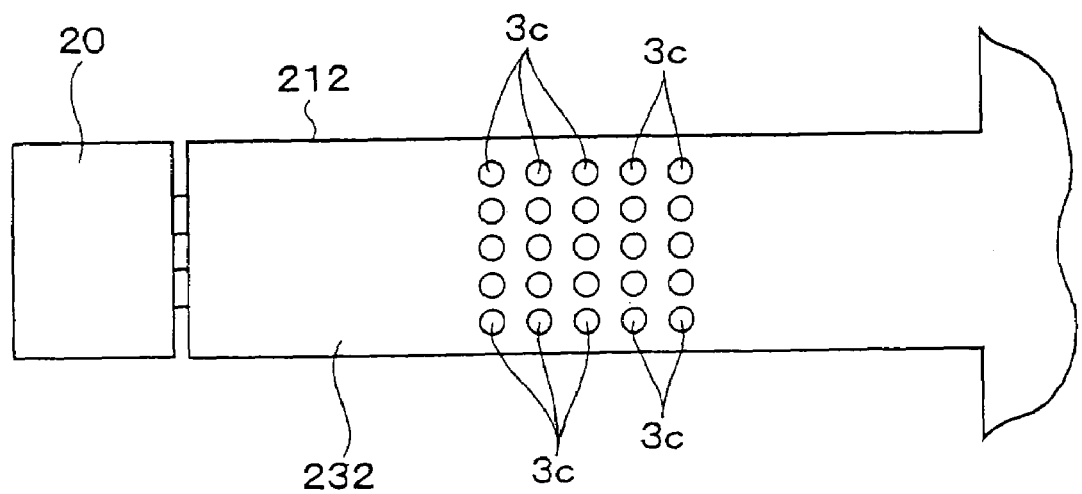
FIG. 9 is a plan view of a second tab of a flexible optical connecting part according to a second embodiment of the present invention.

FIG. 9 is a plan view of a second tab of a flexible optical connecting part according to a second embodiment of the present invention.

The flexible optical connecting part according to the second embodiment has substantially the same construction as that of the flexible optical connecting part according to the first embodiment, except some portions thereof. Hence, component parts identical to those of the first embodiment are designated by the same reference numerals, and detailed description thereof is omitted. The following description will be given only of the portions of the present embodiment distinguishing the construction thereof from that of the first embodiment.

In the first embodiment, it is determined in advance that the optical connector 20 provided on the second tab 12 of the flexible optical connecting part is connected to the mating optical connector 22 in the state where the direction of the width thereof and the mounting surface 21a of the printed circuit board 21 are parallel to each other. However, in the second embodiment, it is not predetermined whether the optical connector 20 provided on a second tab 212 of the flexible optical connecting part is connected to a mating optical connector in a state where the direction of width thereof and the mounting surface 21a of the printed circuit board 21 are parallel to each other, or in a state where the direction of the width thereof and the mounting surface 21a of the printed circuit board 21 are at right angles to each other. Therefore, the second tab 212 is required to have sufficient flexibility both in the direction of thickness thereof and the direction of torsion thereof. To meet this requirement, a second tab-forming portion 232 is provided with portions (removed portion-defining portions) formed with a plurality of dot-shaped holes (removed portions) 3c. These holes 3c are arranged in the form of a lattice. Although the flexibility of the second tab 212 in the direction of thickness thereof, which is increased by the holes, is inferior to the flexibility of the second tab 12 in the direction of thickness thereof, it is superior to flexibility of the tab 15 exhibited when it is bent in the direction of thickness thereof. Similarly, although the flexibility of the second tab 212 in the direction of torsion thereof is inferior to the flexibility of the tab 15 in the direction of torsion thereof, it is superior to flexibility of the tab 12 exhibited when it is twisted.

According to the second embodiment, it is possible to obtain the same advantageous effects as provided by the first embodiment, and further enhance the flexibility of the second tab 212 both in the direction of thickness thereof and the direction of torsion thereof.

Figure 10:
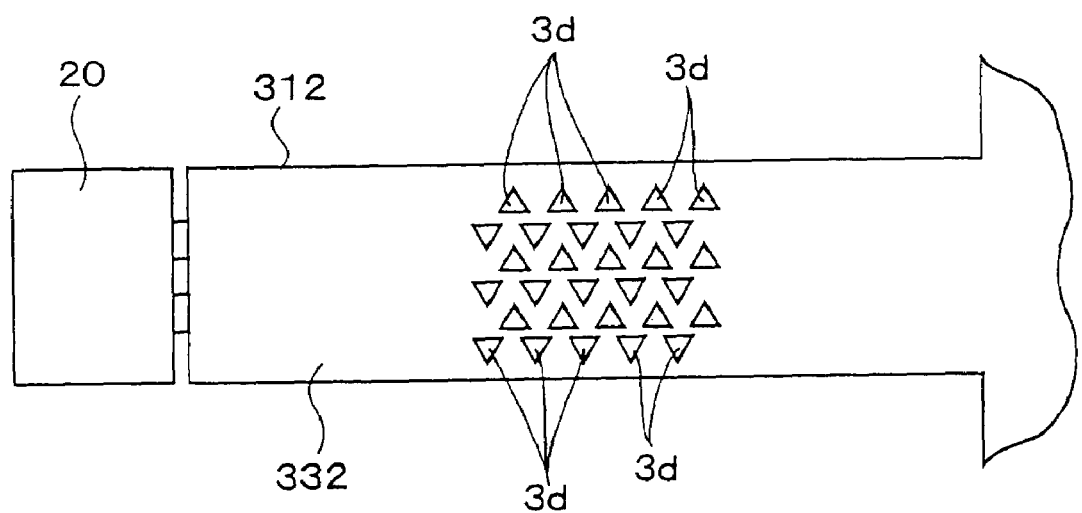
FIG. 10 is a plan view of a second tab of a flexible optical connecting part according to a third embodiment of the present invention.

FIG. 10 is a plan view of a second tab of a flexible optical connecting part according to a third embodiment of the present invention.

The flexible optical connecting part according to the third embodiment has substantially the same construction as that of the flexible optical connecting part according to the first embodiment, except some portions thereof. Hence, component parts identical to those of the first embodiment are designated by the same reference numerals, and detailed description thereof is omitted. The following description will be given only of the portions of the present embodiment distinguishing the construction thereof from that of the first embodiment.

In the third embodiment, similarly to the second embodiment, flexibility of a second tab 312 is increased both in the direction of thickness thereof and the direction of torsion thereof. To this end, in the third embodiment, a third tab-forming portion 332 is provided with portions (removed portion-defining portions) formed with a plurality of triangular holes (removed portions) 3d. These holes 3d are arranged in the form of a face-centered lattice.

As described above, by arranging the holes 3d in the form of the face-centered lattice, it is possible to further increase the density of the layout of the holes 3d in comparison with the second embodiment.

According to the third embodiment, it is possible to obtain the same advantageous effects as provided by the first embodiment and further enhance flexibility of the second tab both in the direction of thickness thereof and the direction of torsion thereof in comparison with the second embodiment, since the density of the layout of the holes $3d$ can be further increased in comparison with the second embodiment.

It should be noted that the shapes of the cuts $3a$ and $3b$, the numbers of the cuts $3a$ and $3b$, and the layouts of the cuts $3a$ and $3b$ are not limited to those in the first embodiment, but they are determined depending on the required degree of flexibility, the directions of bending and torsion of the tabs. However, it is preferable that the cuts $3a$ and $3b$ each have a width in the range between 0.05 mm and 1.0 mm, since there is a fear that cuts each having a width smaller than this range make it difficult to obtain the advantageous effects of the cuts, whereas cuts each having a width larger than this range adversely influences the precision arrangement of the optical fiber. In general, a range of approximately 0.1 mm to 0.3 mm is suitable for the width of each of the cuts $3a$ and $3b$.

Although the MT-type optical connector is used as the optical connector 20 in the above-described embodiments, this is not limitative, but it is possible to employ optical connectors generally commercially available. Examples of the optical connectors generally commercially available include single core-type connectors, such as connectors of an MU type, an LC type, an FC type, an SC type, an SMA type, and a PC type, and multicore-type connectors, such as connectors of an MPO type.

Further, similarly to the second and third embodiments, when the holes $3c$ and $3d$ are provided as the removed portions, the degree of the flexibility of the tabs is determined depending on the shapes of the holes, such as circular shapes and polygonal (e.g. triangular and quadrangular) shapes, and the sizes of the holes. Since extremely large holes can adversely influence the laying of the optical fibers, it is preferable that the diameter of the holes (the diameter of circumcircles in the case of holes having a polygonal shape) is between 0.05 mm and 1.0 mm. Particularly preferably, the holes have a diameter of approximately 0.1 mm to 0.5 mm.

Although the removed portions are provided, in the first embodiment, by the cuts $3a$ and $3b$ formed in the flexible base 3, and in the second and third embodiments, by the holes $3c$ and $3d$ formed in the flexible base 3, this is not limitative, but the removed portions may be provided by the grooves or the like formed in the flexible base 3.

Further, although in the first to third embodiments, the cuts $3a$ and $3b$ and the holes $3c$ and $3d$ are formed by irradiating the laser beam onto the flexible base 3, the cuts $3a$ and $3b$ and the holes $3c$ and $3d$ may be formed mechanically e.g. by a cutter, or chemically by etching or the like.

Further, although in the first to third embodiments, the flexible base 3 is formed with the cuts $3a$ and $3b$ and the holes $3c$ and $3d$, this is not limitative, but the flexible protective sheet 7 may be formed with the cuts or the holes, or both of the flexible base 3 and the flexible protective sheet 7 may be formed with the cuts or the holes. In this case, it is preferable that the cuts or holes on the flexible base side are displaced from the cuts or holes on the flexible protective sheet side in the direction of length of each tab.

EXAMPLES

In the following, a description will be given of Example of the flexible optical connecting part shown in FIG. 1 to FIG. 8.

For the flexible base 3, there was used a polyimide film "Kapton-200H" (50 μm thick, available from DuPont-Toray Co., Ltd.), and for the material of the first and second adhesive layers 4 and 6, there was used "DKQ-9-9009" (100 μm thick, available from Dow Corning Corporation). For the optical fiber 5, there was used the single-mode optical fiber "SM-1005 (UV)" (available from Hitachi Cable, Ltd.), and for the optical connector 20, there was used the MT optical connector of the 4-core type. The tabs 11 to 18 were formed to have a rectangular shape with a width of 3 mm and a length of 80 mm. The tabs 11 to 18 each had four optical fibers 5 laid on the flexible base 3 at a pitch of 0.25 mm.

The tabs 11 to 14 were each formed with the cuts $3a$ shown in FIG. 5. The cuts $3a$ had a width of 0.1 mm, a pitch of 1 mm, and a length of 100 mm. In the state where the tab 12 formed with the cuts $3a$ had one end (on the body 10 side) thereof fixed, and a downward load of 1 gram applied to the other end (on the optical connector 20 side) thereof, a measurement was made of the amount of bending (length of downward bending) of the tab 12. The results of the measurement showed that the amount of bending of the tab 12 of this Example was approximately 16 mm, whereas the amount of bending of a tab with no cuts $3a$ formed therein (this tab had the same construction except that it had no cuts $3a$) was 8 mm. Thus, the advantageous effects of provision of the cuts $3a$ were confirmed.

In the following, a description will be given of Example of the flexible optical connecting part shown in FIG. 9.

For the flexible base 3, there was used a polyphenylene sulfide (PPS) film "Torelina-3000" (75 μm thick, available from Toray Industries. Inc.), and for the material of the first and second adhesive layers 4 and 6, there was used an adhesive sheet "No. 500" (100 μm thick, available from Nitto Denko Corporation). For the optical fiber 5, there was used the single-mode optical fiber "SM-1005 (UV)" (available from Hitachi Cable, Ltd.), and for the optical connector 20, there was used the MT optical connector of the 4-core type. The tab 212 had a rectangular shape with a width of 3 mm and a length of 80 mm. The tabs each had four optical fibers 5 laid on the flexible base 3 at a pitch of 0.25 mm. The tab-forming portion 232 was formed with the holes $3c$ shown in FIG. 9. The holes $3c$ had a diameter of 0.5 mm and a pitch of 1 mm, and were arranged in the form of a tetragonal lattice. In the state where the tab 212 formed with the holes $3c$ had one end (on the body 10 side) thereof fixed, and a downward load of 1 gram applied to the other end (on the optical connector 20 side) thereof, a measurement was made on the amount of bending of the tab 212. The results of the measurement showed that the amount of bending of the tab 212 of this Example was approximately 10 mm, whereas the amount of bending of a tab with no holes $3c$ formed therein (this tab had the same construction except that it had no holes $3c$) was 4 mm. Thus, the advantageous effects of the holes $3c$ were confirmed.

It is further understood by those skilled in the art that the foregoing are the preferred embodiments of the present invention, and that various changes and modification may be made thereto without departing from the spirit and scope thereof.

What is claimed is:

1. A flexible optical connecting part including a body and at least one tab continuous with said body, the flexible optical connecting part comprising:
a lower flexible board comprising: (i) a lower body-forming part that forms a lower part of said body, and (ii) at least one lower tab-forming portion that forms a lower part of said at least one tab and that is continuous with said lower body-forming part;
an upper flexible board comprising: (i) an upper body-forming part that forms an upper part of said body, and (ii) at least one upper tab-forming portion that forms an upper part of said at least one tab and that is continuous with said upper body-forming part;

a first adhesive layer provided on said lower flexible board;

a second adhesive layer provided on an underside of said upper flexible board;

at least one optical fiber interposed between said first adhesive layer and said second adhesive layer such that said at least one optical fiber is fixed therebetween;

at least one optical connector provided on said at least one tab and connected to said at least one optical fiber; and a plurality of removed portions which are formed by removing portions of at least one of said upper tab-forming part and said lower tab-forming part;

wherein the removed portions comprise cuts.

2. A flexible optical connecting part as claimed in claim 1, wherein said cuts extend in a direction of width of said lower and upper tab-forming portions.

3. A flexible optical connecting part as claimed in claim 1, wherein said cuts extend obliquely with respect to a direction of width of said lower and upper tab-forming portions.

4. A flexible optical connecting part including a body and at least one tab continuous with said body, the flexible optical connecting part comprising;

a lower flexible board comprising: (i) a lower body-forming part that forms a lower part of said body, and (ii) at least one lower tab-forming portion that forms a lower part of said at least one tab and that is continuous with said lower body-forming part;

an upper flexible board comprising: (i) an upper body-forming part that forms an upper part of said body, and (ii) at least one upper tab-forming portion that forms an upper part of said at least one tab and that is continuous with said upper body-forming part;

a first adhesive layer provided on said lower flexible board;

a second adhesive layer provided on an underside of said upper flexible board;

at least one optical fiber interposed between said first adhesive layer and said second adhesive layer such that said at least one optical fiber is fixed therebetween;

at least one optical connector provided on said at least one tab and connected to said at least one optical fiber; and a plurality of removed portions which are formed by removing portions of at least one of said upper tab-forming part and said lower tab-forming part;

wherein said removed portions comprise holes.

5. A flexible optical connecting part as claims in claim 4, wherein the holes are triangular and are arranged in a face-centered lattice.

* * * * *